United States Patent
Yellapragada

(10) Patent No.: US 11,346,226 B2
(45) Date of Patent: May 31, 2022

(54) TURBOCHARGER AND TURBINE WHEEL

(71) Applicant: BorgWarner Inc., Auburn Hills, MI (US)

(72) Inventor: Lakshmi Srikar Yellapragada, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 233 days.

(21) Appl. No.: 16/472,558

(22) PCT Filed: Dec. 22, 2017

(86) PCT No.: PCT/US2017/068174
§ 371 (c)(1),
(2) Date: Jun. 21, 2019

(87) PCT Pub. No.: WO2018/119391
PCT Pub. Date: Jun. 28, 2018

(65) Prior Publication Data
US 2019/0316470 A1    Oct. 17, 2019

Related U.S. Application Data

(60) Provisional application No. 62/438,696, filed on Dec. 23, 2016.

(51) Int. Cl.
*F01D 5/14*    (2006.01)
*F01D 5/30*    (2006.01)
(Continued)

(52) U.S. Cl.
CPC ............. *F01D 5/147* (2013.01); *F01D 5/141* (2013.01); *F01D 5/3023* (2013.01); *F02C 6/06* (2013.01);
(Continued)

(58) Field of Classification Search
CPC ........ F01D 5/141; F01D 5/147; F01D 5/3023; F01D 5/048; F01D 17/165; F05D 2220/40
See application file for complete search history.

(56) References Cited

U.S. PATENT DOCUMENTS 6,280,144 B1    8/2001    Powers
6,616,409 B2    9/2003    Bradbury et al.
(Continued)

FOREIGN PATENT DOCUMENTS

DE    102008045171 A1    3/2010
EP    2 960 462 A1    12/2015
(Continued)

OTHER PUBLICATIONS

International Search Report from the International Bureau of WIPO dated Mar. 21, 2018 and dated Apr. 5, 2018 for PCT/US2017/068174.

Primary Examiner — Woody A Lee, Jr.
Assistant Examiner — Behnoush Haghighian
(74) Attorney, Agent, or Firm — Young Basile Hanlon & MacFarlane, P.C.

(57) ABSTRACT

A turbine wheel (100) for a turbocharger includes a hub (110) and blades (120). The hub includes a primary outer surface (116), a back wall surface (115), a peripheral edge (119) extending between the primary outer surface and the back wall surface, and a central axis (111). The hub has a back wall thickness measured parallel to the central axis from the primary outer surface to the back wall surface. The blades (120) extend from the primary outer surface of the hub and are integrally formed with the hub by casting. Each blade has a blade thickness measured tangential to the central axis between opposed surfaces of the blade. A maximum diameter of the peripheral edge is 60 mm or more. Over a majority of a radially outer region (117), a thickness
(Continued)

ratio of the blade thickness to the back wall thickness varies by 25% or less. The radially outer region extends from the peripheral edge to a 25% meridional.

7 Claims, 13 Drawing Sheets

(51) Int. Cl.
*F02C 6/06* (2006.01)
*F01D 17/16* (2006.01)
*F01D 5/04* (2006.01)

(52) U.S. Cl.
CPC ............ *F01D 5/048* (2013.01); *F01D 17/165* (2013.01); *F05D 2220/40* (2013.01); *F05D 2240/241* (2013.01); *F05D 2240/30* (2013.01)

(56) References Cited

U.S. PATENT DOCUMENTS

| | | | |
|---|---|---|---|
| 7,771,162 B2 | 8/2010 | Castan | |
| 7,798,770 B2* | 9/2010 | Sumser | F01D 5/16 415/157 |
| 8,096,777 B2* | 1/2012 | Yokoyama | F01D 5/141 416/223 R |
| 8,360,730 B2* | 1/2013 | Chen | F01D 5/141 416/188 |
| 8,517,664 B2 | 8/2013 | Sun et al. | |
| 8,834,104 B2* | 9/2014 | Mohamed | F01D 17/165 415/164 |
| 9,051,839 B2 | 6/2015 | Senoo | |
| 9,683,442 B2* | 6/2017 | Dextraze | F04D 17/10 |
| 9,896,937 B2* | 2/2018 | Dextraze | F01D 5/145 |
| 10,001,012 B2* | 6/2018 | Scherrer | F02B 33/40 |
| 10,006,297 B2* | 6/2018 | Yoshida | F01D 5/141 |
| 10,253,633 B2* | 4/2019 | Klaus | F01D 5/141 |
| 10,689,982 B2* | 6/2020 | Soeguet | F01D 5/141 |
| 2007/0128018 A1* | 6/2007 | Sumser | F02C 6/12 415/203 |
| 2010/0098548 A1* | 4/2010 | Yokoyama | F01D 5/141 416/223 R |
| 2010/0202889 A1 | 8/2010 | Klingels et al. | |
| 2011/0314808 A1* | 12/2011 | Mohamed | F01D 17/165 60/602 |
| 2013/0280060 A1 | 10/2013 | Nasir | |
| 2015/0086395 A1* | 3/2015 | Dextraze | F04D 29/4206 417/405 |
| 2015/0086396 A1* | 3/2015 | Nasir | F01D 17/165 417/407 |
| 2015/0204195 A1* | 7/2015 | Klaus | F04D 25/024 416/242 |
| 2015/0361802 A1* | 12/2015 | Yoshida | F01D 5/26 415/119 |
| 2016/0053616 A1* | 2/2016 | Scherrer | F02B 37/00 416/223 A |
| 2017/0298819 A1* | 10/2017 | Kuno | F04D 25/04 |
| 2018/0238339 A1* | 8/2018 | Nickson | F04D 29/284 |

FOREIGN PATENT DOCUMENTS

| | | |
|---|---|---|
| WO | 2013162874 A1 | 10/2013 |
| WO | 2014098151 A1 | 6/2014 |
| WO | 2014165355 A1 | 10/2014 |

* cited by examiner

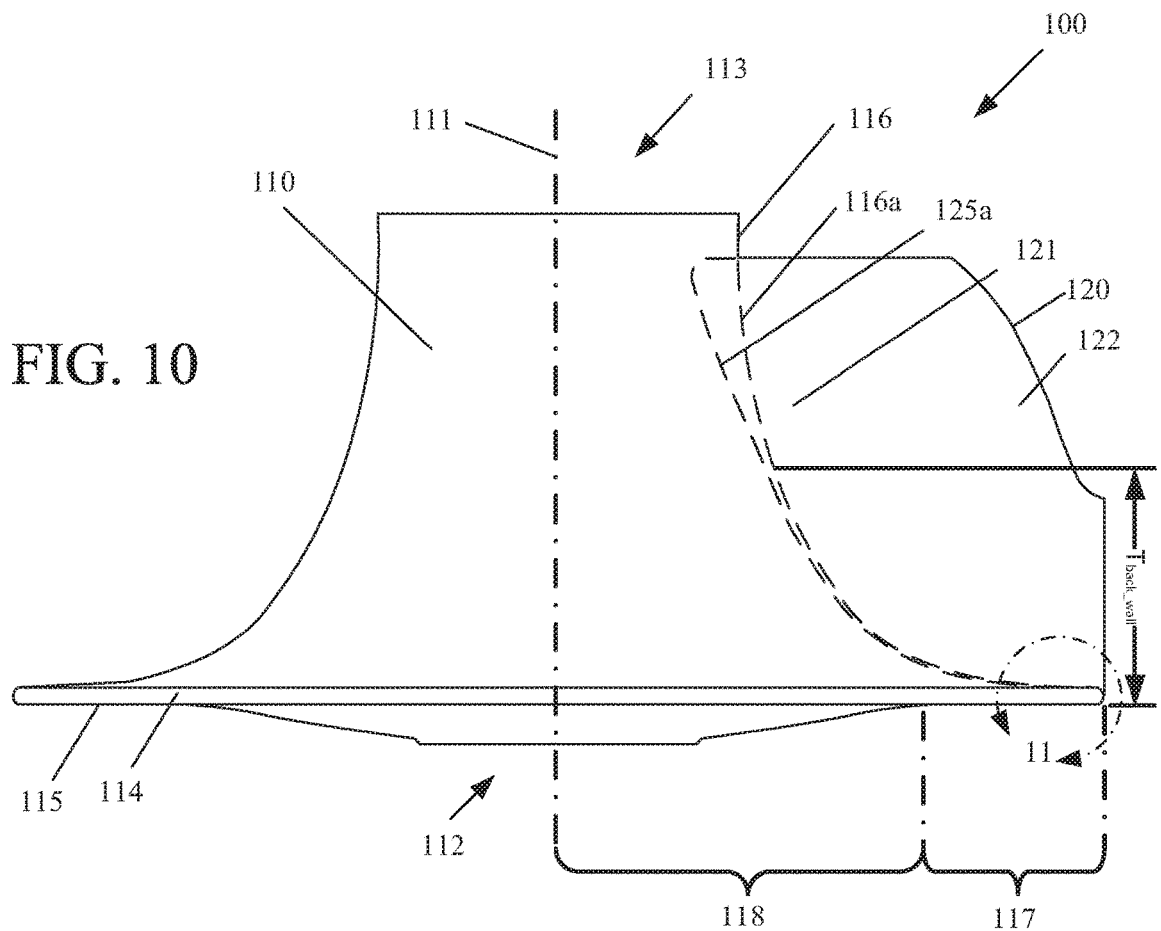
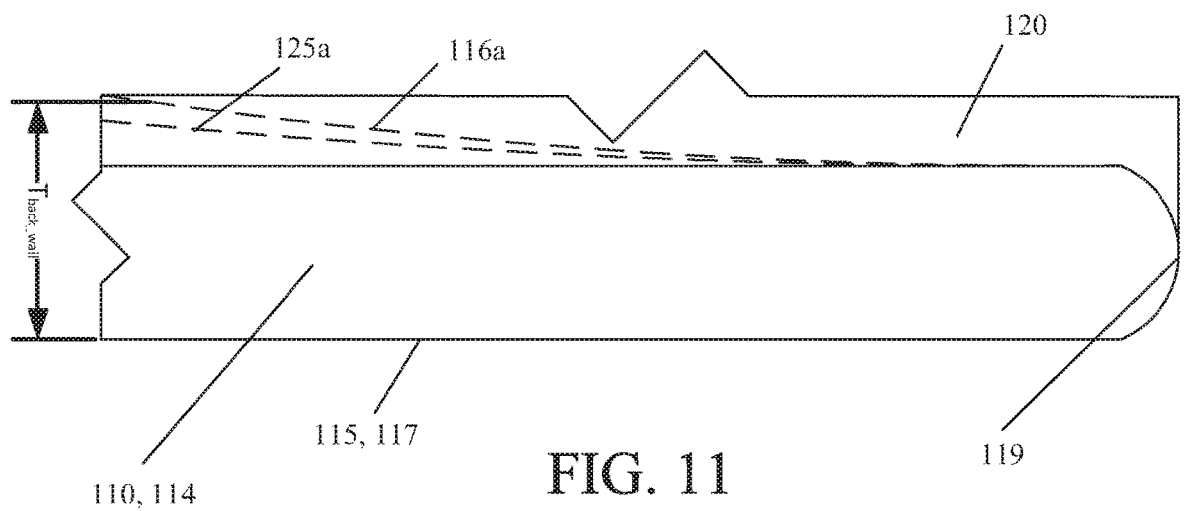

TURBOCHARGER AND TURBINE WHEEL

TECHNICAL FIELD

This disclosure relates to turbochargers and, in particular, turbine wheels for turbochargers.

BACKGROUND

A turbocharger, such as for an internal combustion engine, includes a turbine wheel that is turned at a high rate of speed (e.g., up to 250,000 rpm) by exhaust gas from the engine. Each turbine wheel generally includes a hub and a plurality of blades, which extend radially outward from the hub. Turbine wheels have precisely designed geometries with tight manufacturing tolerances, and failure to meet these tolerances during manufacturing can lead to various problems. For example, an out-of-specification turbine wheel may spin out of balance, leading to excessive vibrations, wear of the turbine wheel and other turbocharger components (e.g., bearings), and ultimately premature failure of the turbocharger.

One source for out-of-specification turbine wheels, is irregularity of the back wall (e.g., waviness or other repeated irregularity, droop or other localized irregularity, etc.). As shown in FIG. 1, back wall irregularity of the turbine wheel is a circumstance in which the actual axial position of various points on the surface of the back wall vary relative to the specification when moving circumferentially about the central axis of the turbine wheel. Back wall irregularity may, for example, result from a casting process during which the turbine wheel is initially formed. Back wall irregularity may result in rotational unbalance as the turbine wheel rotates due to uneven mass distribution. Furthermore, the back wall of the turbine wheel may be used as a datum (i.e., reference surface) for other post-casting machining, such as for coupling a rotation shaft to the turbine wheel. Thus, back wall irregularity may, thereby, result in imprecise (e.g., off axis) coupling of the rotation shaft to the turbine wheel and related rotational unbalance.

Back wall irregularity and related rotational unbalance may be compounded for relatively large turbine wheels (i.e., those having a larger maximum diameter). The back wall irregularity may be exacerbated at radially outer positions, as small radially inward irregularities may translate into larger radially outward irregularities. For example, by approximating the back wall profile in cross section as a straight line extending outward from the central axis, the surface of the back wall may be measured at 50 microns out of position at R (i.e., where R equals the radius of a small turbine wheel), which would translate into the surface of the back wall being roughly 100 microns out of position at 2R (e.g., the radius of a large turbine wheel). As a result, the smaller turbine wheel may fall within specification (e.g., 75 microns), while the larger wheel does not. Furthermore, the rotational unbalance of larger turbine wheels is compounded, since rotational unbalance is a product of the radial location (i.e., radius) of the irregularity (e.g., the material mass forming the back wall irregularity).

Turbine wheels that have back wall irregularity may be machined to be brought within specification and tolerances. For example, material may be removed from the back wall to provide generally even mass distribution about the axis of rotation by making cuts (e.g., balancing cuts) or using another machining operation. Because of the aforementioned compounded effects of back will irregularity for relatively larger turbine wheels, greater amounts of machining (e.g., material removal) may be required. However, especially for such turbine wheels that also have a relatively thin back wall, the required machining to correct back will irregularity may violate other specifications and tolerances (e.g., retaining sufficient material for strength characteristics) and, thereby, result in the need to scrap such turbine wheels.

It would, therefore, be advantageous to provide a turbine wheel having a design with a relatively large diameter and a relatively thin back wall, but which is more robust to back wall irregularity caused by the casting process. As a result, the time and cost of post-casting machining may be avoided or lessened and scrap rate may be reduced.

SUMMARY

Various turbine wheels are disclosed herein. In one implementation, a turbine wheel for a turbocharger includes a hub and a plurality of blades. The hub includes a primary outer surface, a back wall surface, a peripheral edge extending between the primary outer surface and the back wall surface, and a central axis. The hub has a back wall thickness that is measured parallel to the central axis from the primary outer surface to the back wall surface. Each of the blades extend from the primary outer surface of the hub and are integrally formed with the hub via a casting process. Each of the blades has a blade thickness that is measured tangential to the central axis between opposed surfaces of the blade. A maximum diameter of the peripheral edge is 60 mm or more. Over a majority of a radially outer region, a thickness ratio of the blade thickness to the back wall thickness varies by 25% or less. The radially outer region extends from the peripheral edge to a 25% meridional distance along the primary outer surface.

In another implementation, a turbine wheel for a turbocharger includes a hub and a plurality of blades. The hub includes a primary outer surface, a back wall surface, a peripheral edge extending between the primary outer surface and the back wall surface, and a central axis. The hub has a back wall thickness that is measured parallel to the central axis from the primary outer surface to the back wall surface. Each of the blades extends from the primary outer surface of the hub and is integrally formed with the hub via a casting process. Each of the blades has a blade thickness that is measured tangential to the central axis between opposed surfaces of the blade. A maximum diameter of the peripheral edge is 60 mm or more. Over a majority of a radially outer region, a thickness ratio of the blade thickness to the back wall thickness is one or less. The radially outer region extends from the peripheral edge to a 25% meridional distance along the primary outer surface.

In one implementation, a turbine wheel for a turbocharger includes a hub and a plurality of blades. The hub includes a primary outer surface, a back wall surface, a peripheral edge extending between the primary outer surface and the back wall surface, and a central axis. The hub has a back wall thickness that is measured parallel to the central axis from the primary outer surface to the back wall surface. The blades extend from the primary outer surface of the hub and are integrally formed with the hub via a casting process. Each of the blades has a blade thickness that is measured tangential to the central axis between opposed surfaces of the blade. Over a majority of a radially outer region, a thickness ratio of the blade thickness to the back wall thickness is between 0.8 and 1.2. The radially outer region extends from the peripheral edge to a 25% meridional distance along the primary outer surface.

According to an embodiment, a method is provided for manufacturing a turbocharger, which comprises casting a turbine wheel according to a turbine wheel design to form a cast turbine wheel, providing a housing, inserting the cast turbine wheel into the housing, providing a compressor wheel, and coupling the compressor wheel to the turbine wheel. The turbine wheel design comprises a hub and a plurality of blades. The hub comprises a primary outer surface, a back wall surface, and a peripheral edge extending between the primary outer surface and the back wall surface. The hub includes an axis. The blades are coupled to and integrally formed with the primary outer surface of the hub. In an entirety of a radially outer region, the hub has a back wall thickness that is approximately 8% or less of a maximum diameter of the peripheral edge. The maximum diameter of the peripheral edge is approximately 60 mm or more. The radially outer region extends radially inward from the peripheral edge to a 30% meridional distance along the primary outer surface. The back wall thickness is measured parallel to the axis from the primary outer surface to the back wall surface. In the entirety of the radially outer region, each blade has a blade thickness at the hub that is less than the back wall thickness corresponding thereto. The blade thickness is measured tangential to the axis between opposed surfaces of the blade.

A turbocharger includes a housing, a turbine wheel, and a compressor wheel. The turbine wheel is positioned within the housing and is configured to be rotated by exhaust gas received from an engine into the housing. The compressor wheel is coupled to the turbine wheel, and is configured to be rotated by the turbine wheel. The turbine wheel comprises a hub and a plurality of blades. The hub comprises a primary outer surface, a back wall surface, and a peripheral edge extending between the primary outer surface and the back wall surface. The hub includes an axis. The blades are coupled to and integrally formed with the primary outer surface of the hub. In an entirety of a radially outer region, the hub has a back wall thickness that is approximately 8% or less of a maximum diameter of the peripheral edge. The maximum diameter of the peripheral edge is approximately 60 mm or more. The radially outer region extends radially inward from the peripheral edge to a 30% meridional distance along the primary outer surface. The back wall thickness is measured parallel to the axis from the primary outer surface to the back wall surface. In the entirety of the radially outer region, each blade has a blade thickness at the hub that is less than the back wall thickness corresponding thereto. The blade thickness is measured tangential to the axis between opposed surfaces of the blade.

A turbine wheel for a turbocharger comprises a hub and a plurality of blades. The hub includes a primary outer surface, a back wall surface, and a peripheral edge extending between the primary outer surface and the back wall surface. The hub includes an axis. In a radially outer region of the hub, at least a portion of the back wall surface is substantially planar. The blades are coupled to and integrally formed with the primary outer surface of the hub. In an entirety of a radially outer region, the hub has a back wall thickness that is approximately 8% or less of a maximum diameter of the peripheral edge at a 30% meridional distance along the primary outer surface. Adjacent the peripheral edge, the back wall thickness is 2.5% or less of the maximum diameter. The maximum diameter of the peripheral edge is approximately 60 mm or more. The back wall thickness is measured parallel to the axis from the primary outer surface of the hub to a plane formed by the back wall surface. In the entirety of the radially outer region, each blade has a blade thickness at the hub that is less than the back wall thickness corresponding thereto. The blade thickness is measured tangential to the axis between opposed surfaces of the blade.

These and other aspects of the present disclosure are disclosed in the following detailed description of the embodiments, the appended claims and the accompanying figures.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 10 is a cross-sectional view taken along line 10-10 in FIG. 5.

FIG. 11 is a partial view taken along line 11-11 in FIG. 10.

DETAILED DESCRIPTION

The inventor discovered that back wall irregularity of a turbine wheel of a turbocharger, which is caused by the casting process used to manufacture the turbine wheel, may be reduced for relatively large turbine wheels having relatively thin back walls by providing blades of the turbine wheel that are relatively thin at their intersection with the back wall. More specifically, for turbine wheels that are relatively large (i.e., having a large diameter) and have relatively thin back walls (i.e., as measured relative to the overall diameter of the turbine wheel), back wall irregularity may be reduced by designing the blades to have a thickness at the hub that is less than a thickness of the back wall.

During the casting process of turbine wheels, molten metal is poured into a cast mold, which then cools to solidify (e.g., freeze). Without being limited to a particular theory, it is believed that during the casting process of turbine wheels, blades that are thicker, thereby freeze and shrink later, than adjacent regions of the hub. This later freezing and shrinking of the blade during the casting process causes additional stress on the hub, which results in back wall irregularity. By designing the blades to instead have a relatively small thickness (e.g., smaller than the back wall thickness of the hub), less stress is caused by the blade on the back wall, which lessens the back wall irregularity and, thereby, reduces subsequent machining and scrap.

Figure 1:
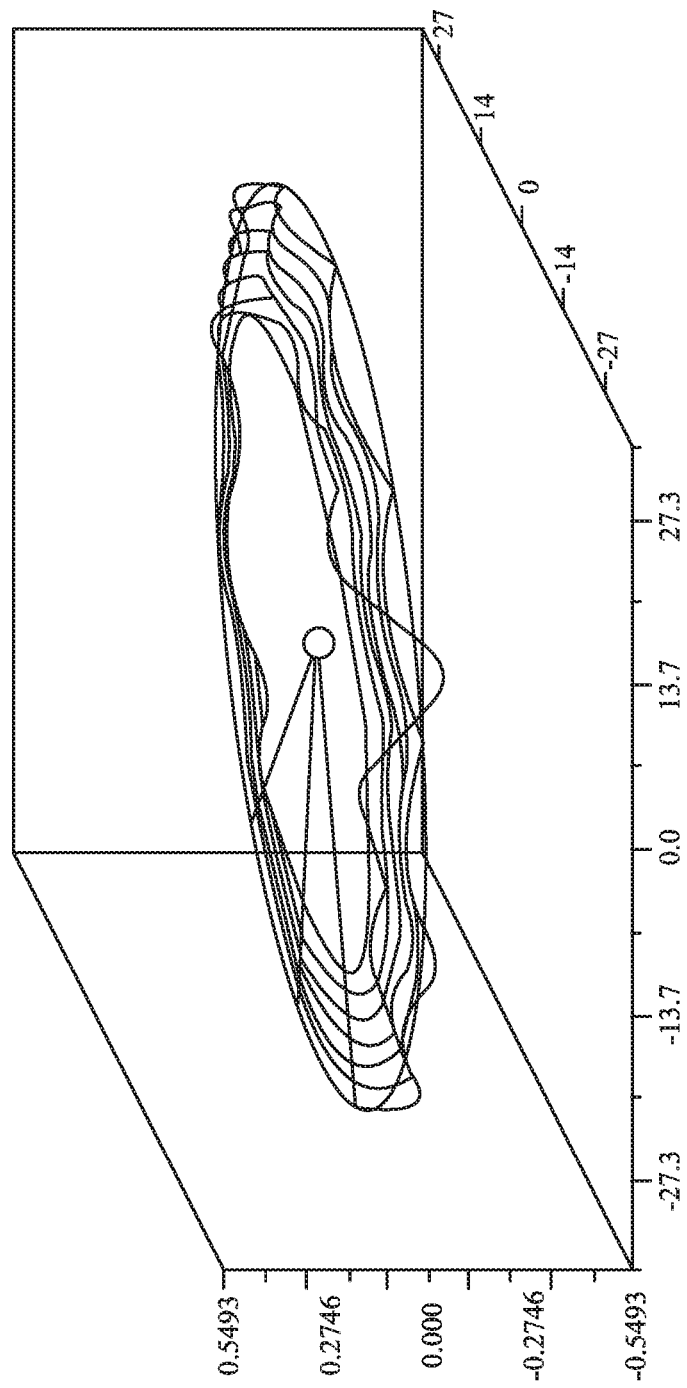
FIG. 1 is a three-dimensional plot of measurements of a surface of a back wall of a turbine wheel, which illustrates back wall irregularity.
Figure 2:
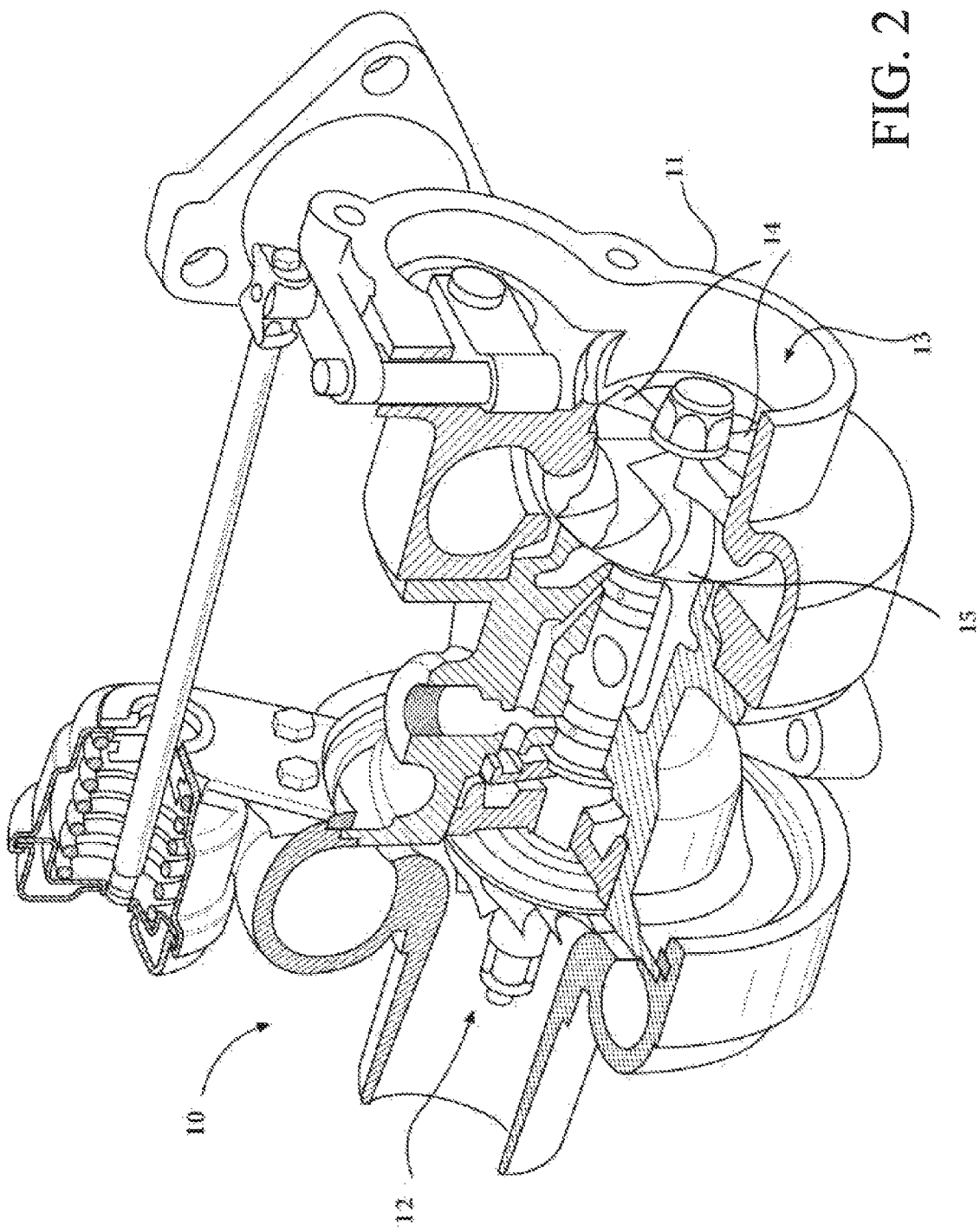
FIG. 2 is a perspective, cutaway view of a turbocharger having a turbine wheel.
Figure 3:
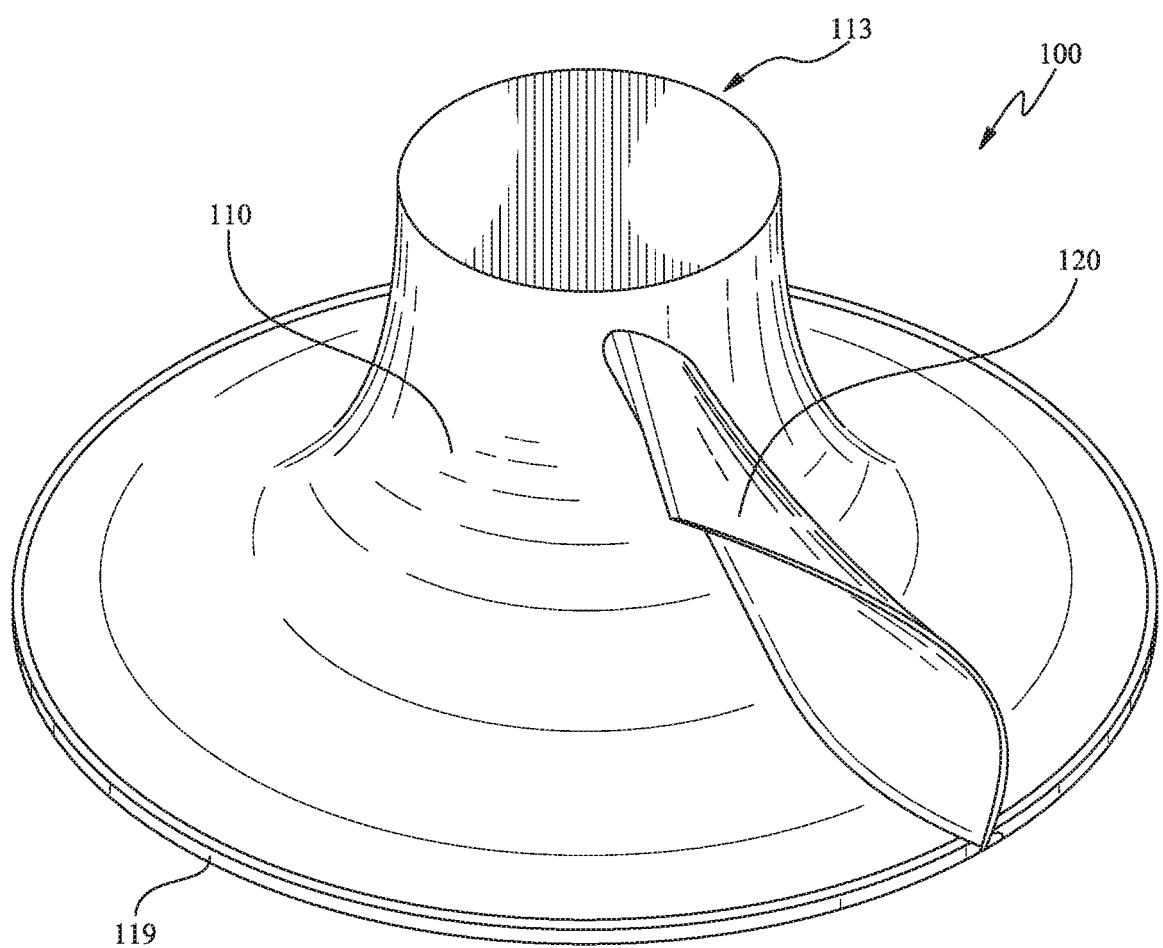
FIG. 3 is a perspective view of a partial turbine wheel according to an embodiment, which includes only one of a plurality of blades.
Figure 4:
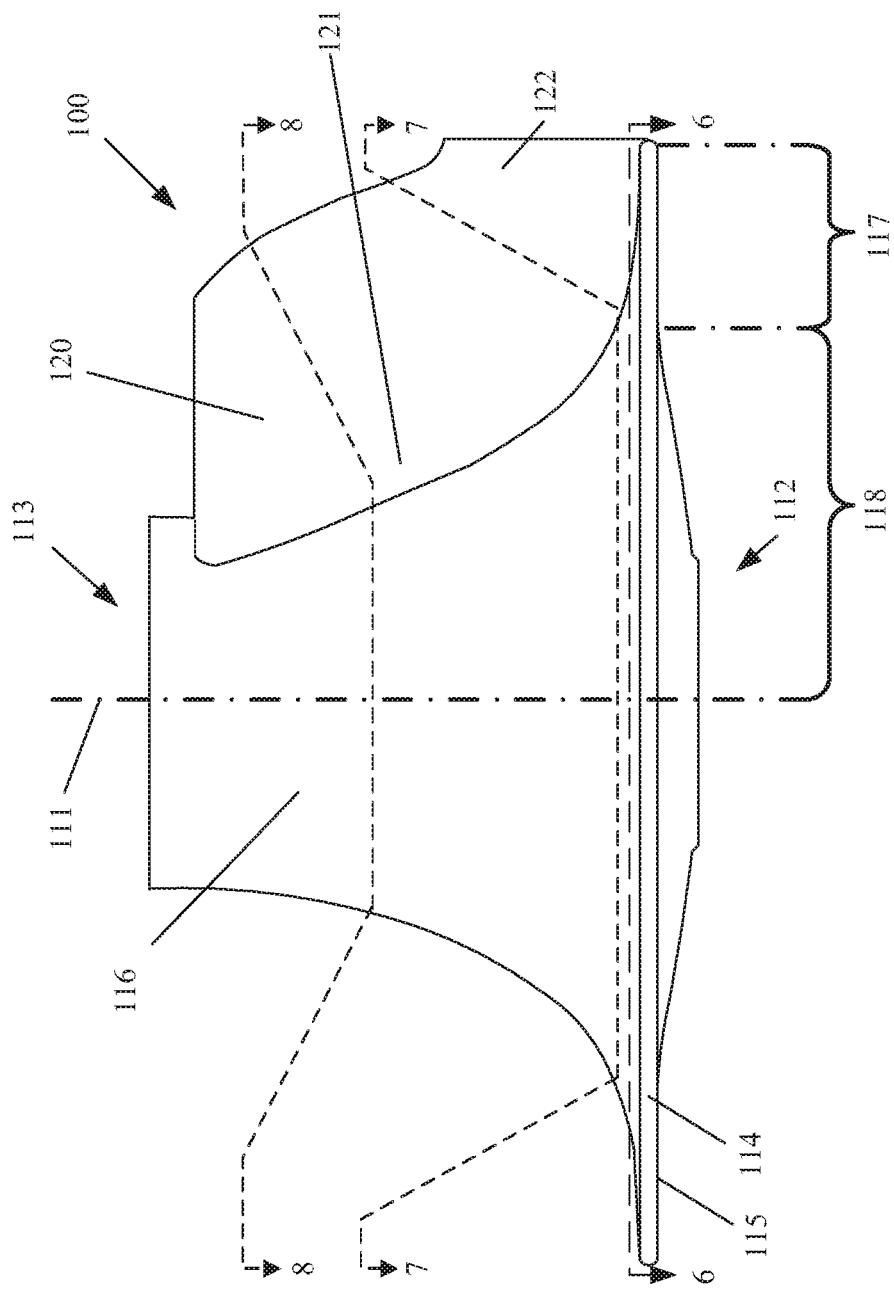
FIG. 4 is a side view of the turbine wheel shown in FIG. 3.
Figure 5:
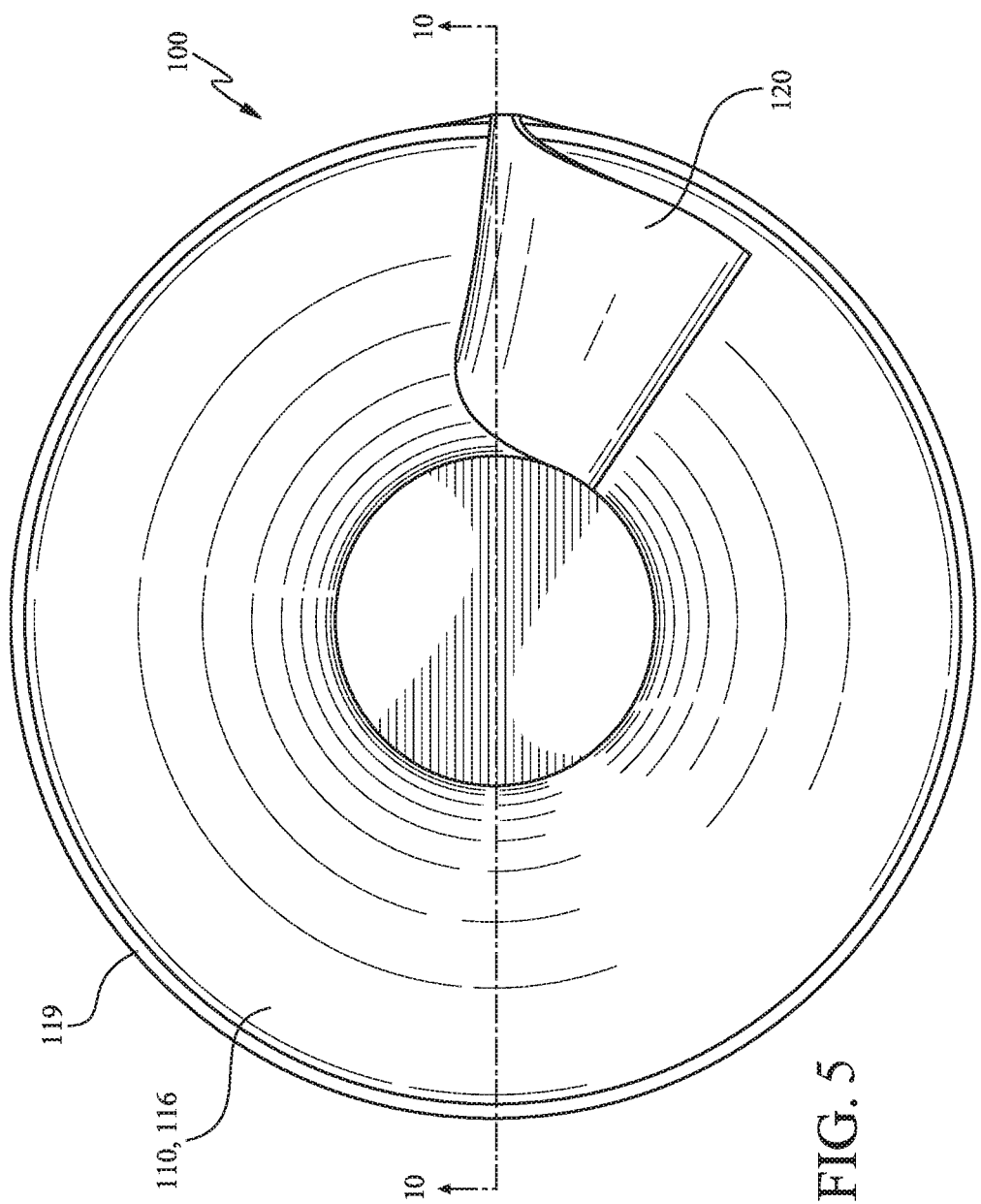
FIG. 5 is a top view of the turbine wheel of FIG. 3.

As shown in FIG. 2, a turbocharger 10, such as for an internal combustion engine (not shown), generally includes a housing 11, a turbine wheel 13 (e.g., turbine), and a compressor wheel 12 (e.g., compressor). The turbocharger 10 receives exhaust gas from the engine, which turns the turbine wheel 13 within the housing 11 at a high rate of speed. The turbine wheel 13, in turn, spins the compressor wheel 12, so as to compress and supply intake air to the engine.

Additionally referring to FIGS. 3-11, a turbine wheel 100, which may be used as the turbine wheel 13 in the turbocharger 10, generally includes a hub 110 and a plurality of blades 120 coupled to and integrally formed with the hub via a casting process. The hub 110 forms the primary body of the turbine wheel 100 and has a central axis 111 about which the turbine wheel 100 spins. The hub 110 extends along the central axis 111 from a first end 112 (i.e., a back wall) to a second end 113, while the blades 120 extend radially outward from an outer surface of the hub 110. For the ease of illustration and understanding, only one blade 120 of the plurality of blades 120 is depicted in FIGS. 3-11, though it should be understood that the turbine wheel 100 includes a plurality of such blades 120 equally spaced about the turbine wheel 100, as shown in FIG. 2.

The turbine wheel 100 is formed from a casting process. For example, the turbine wheel 100 may be formed of a nickel-based superalloy (e.g., Inconel) via an investment casting process, or other suitable material via another suitable casting process.

The hub 110 of the turbocharger 10 includes the central axis 111 about which the turbine wheel 100 rotates or spins. The hub 110 extends along the central axis 111 between the first end 112 (e.g., back or proximal end) and the second end 113 (e.g., forward or distal end). Between the first end 112 and the second end 113, the hub 110 includes a first surface 115 (e.g., the back wall surface, first outer surface) originating at the first end 112, a second surface 116 (e.g., second or primary outer surface) originating at the second end 113, and a peripheral edge 119 extending between the back wall surface 115 and the primary outer surface 116. A back wall 114 of the hub 110 extends radially outward to form the peripheral edge 119 with a generally constant diameter (i.e., the maximum diameter) and extends in a tangential direction between each of the blades 120. By extending tangentially between each of the blades 120, the back wall 114 is considered to be a full back. The plurality of blades 120 are coupled to the primary outer surface 116 of the hub 110. Alternatively, the turbine wheel 100 may have a partially scalloped back wall 114, which extends only partially between adjacent ones of the blades 120.

Figure 6:
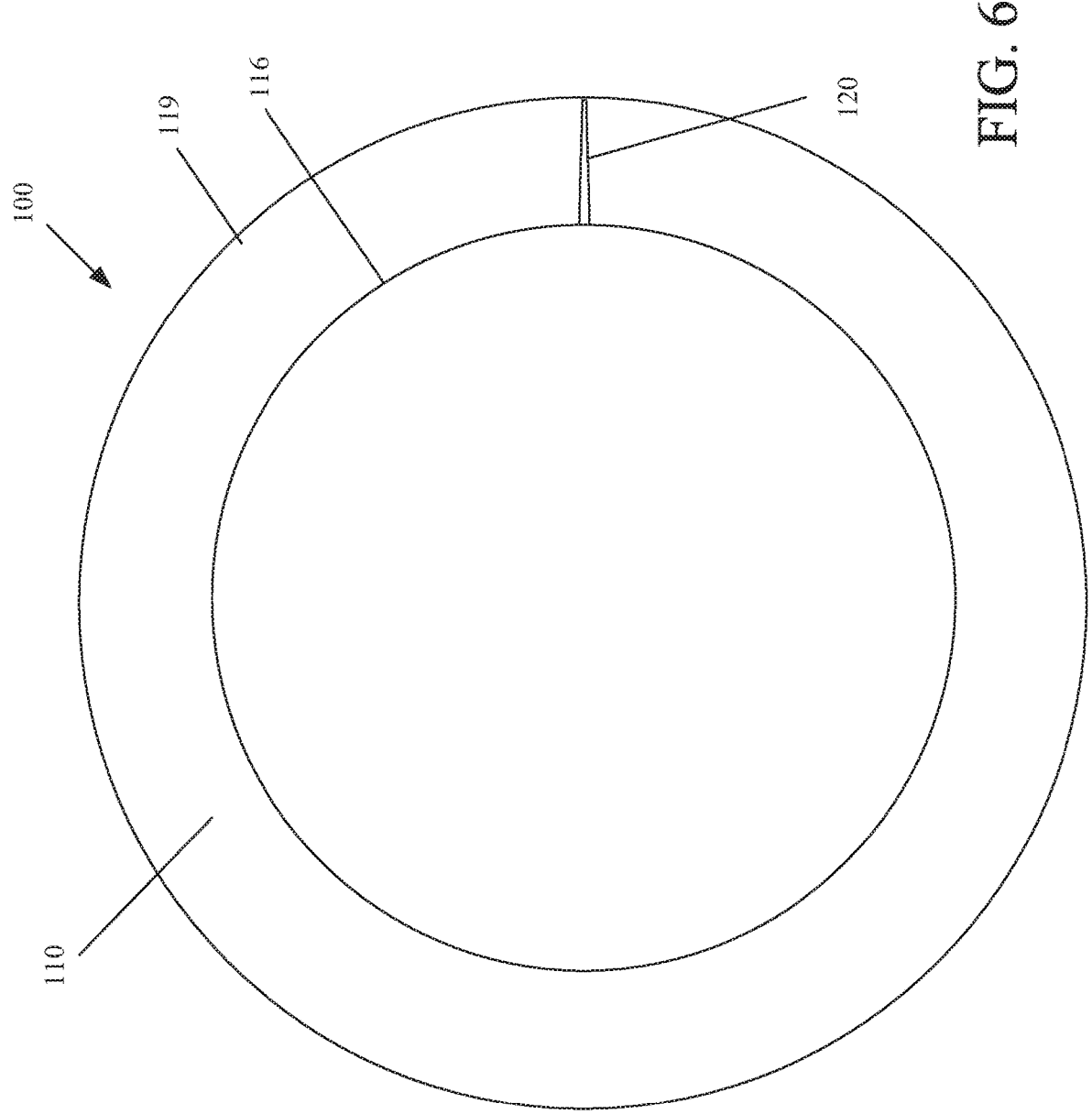
FIG. 6 is a cross-sectional schematic view taken along line 6-6 in FIG. 4.
Figure 7:
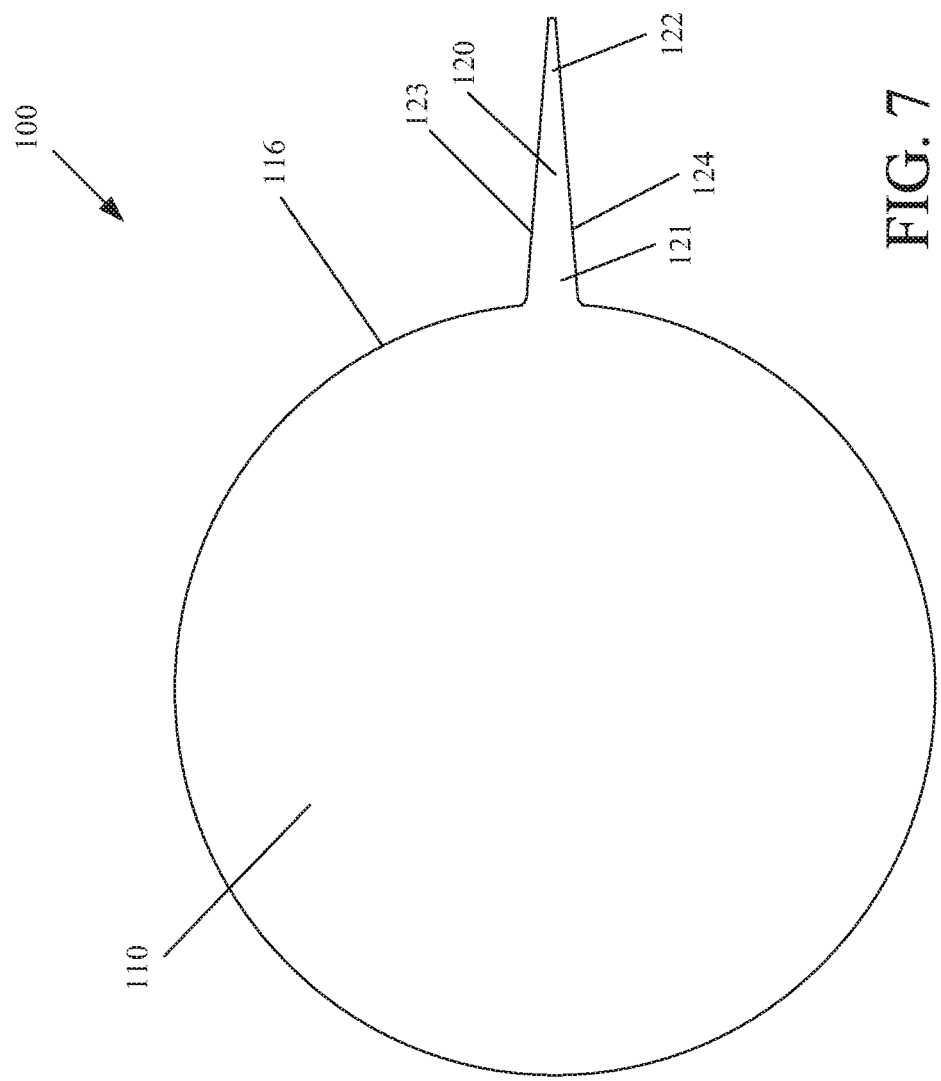
FIG. 7 is a cross-sectional schematic view taken along line 7-7 in FIG. 4, which is a partial view that omits from view portions of the turbine wheel below line 7-7.
Figure 8:
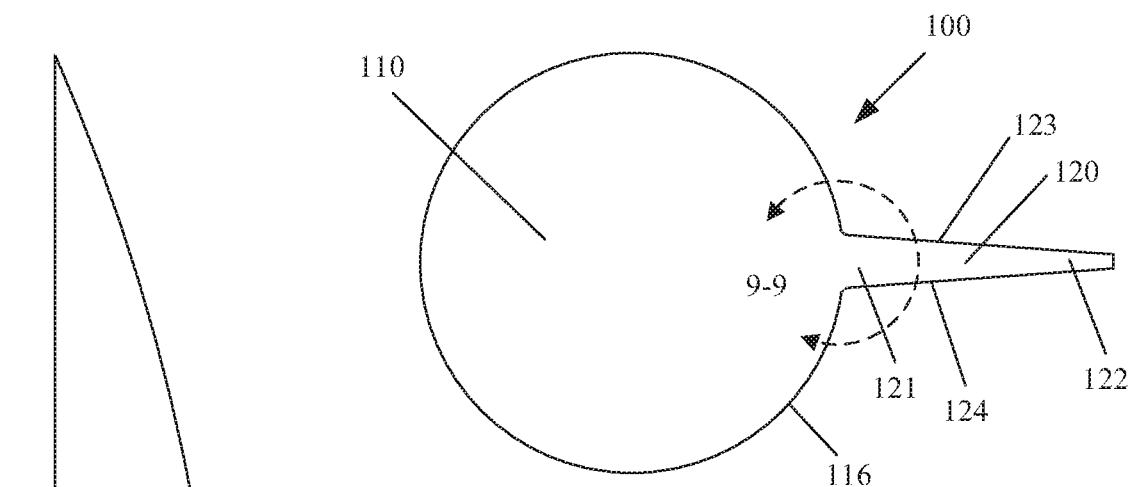
FIG. 8 is a cross-sectional schematic view taken along line 8-8 in FIG. 4, which is a partial view that omits from view portions of the turbine wheel below line 8-8.

In cross-section along the central axis 111 (i.e., perpendicular to the central axis), the primary outer surface 116 of the hub 110 has a substantially circular shape (see FIGS. 6-8; note that FIGS. 7-8 are partial cross-sectional views depicting only a slice of the turbine wheel 100 and omitting portions of the turbine wheel 100 below the section lines 7-7 and 8-8, respectively). In a cross-sectional plane containing the central axis 111 (see FIGS. 10-11), the primary outer surface 116 has a concave profile with the diameter of the hub 110 reducing moving along the central axis 111 from the first end 112 to the second end 113, as shown in FIG. 10. In a radially outer region 117 of the hub 110, the primary outer surface 116 includes a substantially flat or thin region in which the radial position (i.e., diameter) of the primary outer surface 116 changes rapidly as compared to the axial position. In a radially inner region 118 of the hub 110, the axial position of the primary outer surface 116 changes more rapidly than in the radially outer region 117.

In one non-limiting example, the radially outer region 117 of the hub 110 is considered positioned radially outward from approximately 30% of the meridional distance of the hub 110. The meridional distance is defined as the distance measured from the peripheral edge 119 toward the second end 113 of the hub 110 along the contour of the primary outer surface 116 in a plane that extends through the central axis 111 of the hub 110. For illustration, the 0% meridional distance is proximate the outer peripheral edge 119 and the 100% meridional distance is near the central axis 111. Since the hub 110 has a relatively flat outer profile as referenced above, this outer region 117 (again, defined as the 30% meridional distance or region) extends radially inward from the outer peripheral edge 119, which has a maximum radius (R), to a radial distance equal to between approximately two-thirds (⅔) and three-quarters (¾) of the maximum radius ($R_{turbine\_wheel}$) from the central axis 111. It is contemplated that the radially outer region 117 may be defined in other manners, for example, with respect to the radial position, such as the radially outer third (i.e., ⅓), quarter (i.e., ¼), or 10% of the maximum radius (R).

In the radially outer region 117 of the hub 110, the back wall surface 115 is substantially planar. It is contemplated that the back wall surface 115 may have a different profile in the radially outer region 117, for example, by having a non-planar portion (e.g., increasing in axial distance away from the peripheral edge 119 in a linear or non-linear manner) alone or in combination with a planar portion.

As referenced above, the hub 110 is considered to have a relatively thin back wall 114. For embodiments having the back wall surface 115 that forms a plane, the thickness of the back wall 114 (e.g., back wall or hub thickness; $T_{back\_wall}$) is measured parallel with the central axis 111 from the plane formed by the back wall surface 115 to the primary outer surface 116 (see FIGS. 10-11). For embodiments in which the back wall surface 115 does not form a plane, the back wall thickness may instead be measured from a plane extending through the back wall surface 115 immediately adjacent the peripheral edge 119.

At the peripheral edge 119 of the hub 110 (i.e., at the 0% meridional distance), the back wall thickness ($T_{back\_wall}$) is approximately 2.5% or less of the diameter of the peripheral edge 119 (i.e., $T_{back\_wall\_edge} = <2.5\% \times R_{turbine\_wheel} \times 2$), such as between approximately 1.0% and 2.5% (e.g., greater than 1.3% and/or less than approximately 2.0%). For example, for turbine wheels 100 having maximum diameters of 70 mm and 96 mm, the back wall thickness at the peripheral edge 119 is less than or equal to approximately 1.4 mm and 1.9 mm, respectively. At the 30% meridional distance, the back wall thickness ($T_{back\_wall}$) is approximately 15% or less (e.g., less than approximately 8% or less than 6%, between approximately 4% and 8%, approximately 8%, or approximately 4%) of the diameter of the peripheral edge 119 (e.g., $T_{back\_wall\ 30\%} = <15\% \times R_{turbine\ wheel} \times 2$). For example, for turbine wheels 100 having maximum diameters of 70 mm and 96 mm, the back wall thickness at the 30% meridional distance may be less than or equal to approximately 5.6 mm and 7.7 mm, respectively. The peripheral edge 119 may be machined (e.g., to be flat or cylindrical), or be rounded (as shown from casting) or have another reducing edge profile that reduces to a zero thickness, thus the back wall thickness ($T_{back\_wall}$) is positioned immediately radially inward of any such reducing edge profile.

Each of the blades 120 is coupled to the primary outer surface 116 of the hub 110 and extends radially outward from the primary outer surface 116 of the hub 110. Each blade 120 extends radially outward from a base portion 121 to a tip portion 122 thereof, and extends tangentially (e.g., circumferentially) between opposed blade surfaces 123, 124 thereof. The base portion 121 is coupled to the primary outer surface 116 of the hub 110 and may have a greater blade thickness, measured in a tangential direction relative to the central axis 111, than the tip portion 122, as is depicted in FIGS. 6-8. This means that each blade 120 may widen or taper outwardly, typically in a gradual though potentially varying rate, moving in a radially inward direction from the tip portion 122 toward the primary outer surface 116 of the hub 110. Note that each blade 120 and its surfaces 123, 124, while depicted schematically as being symmetric about a plane extending through the central axis 111, may additionally curve or slant in a tangential direction, as the surfaces 123, 124 extend radially outward in constant or variable manners at different radial and/or axial positions.

Figure 9:
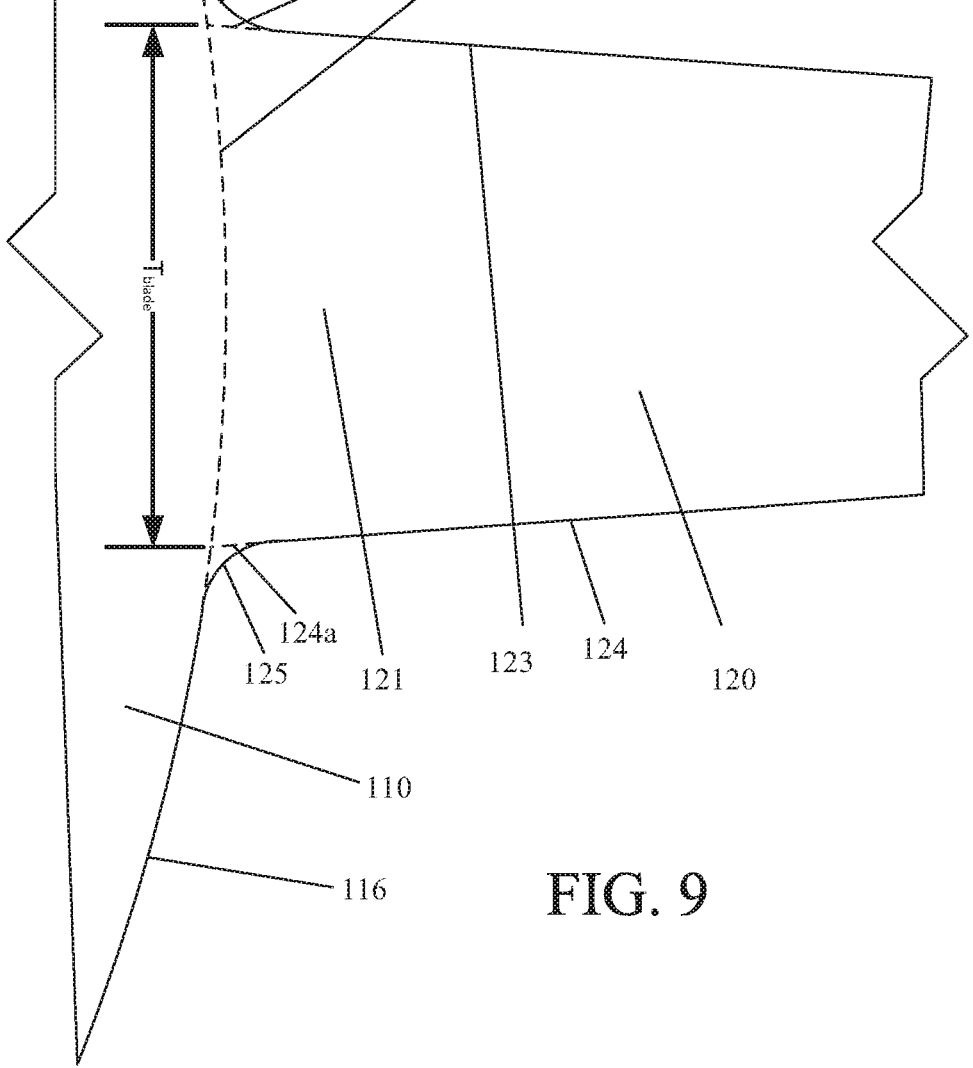
FIG. 9 is a partial view taken along line 9-9 in FIG. 8.

A fillet 125 may also be positioned between the primary outer surface 116 of the hub 110 and the base portion 121 of the blade 120. For example, as shown in FIG. 9, one fillet 125 is positioned on each side of the blade 120 and includes an exposed surface that extends between one of the opposed surfaces 123, 124 of the blade 120 and the primary outer surface 116 of the hub 110. The fillet 125 is the curved region of the turbine wheel 100 between the primary outer surface 116 of the hub 110 and the opposed outer surfaces 123, 124 of the blade 120. For example, at each location along the intersection between the primary outer surface 116 of the hub 110 and the base portion 121 of the blade 120, the fillet 125 may have a substantially constant radius extending between the primary outer surface 116 of the hub 110 and the outer surfaces 123, 124 of the blade 120 in a plane that is substantially normal (i.e., perpendicular) to the primary outer surface 116 (see, e.g., the angle of the cross-sectional cut lines 6-6 and 7-7 in FIG. 4). Moving along the intersection between the primary outer surface 116 of the hub 110 and the base portion 121 of the blade 120, the fillet 125 may have varying radii (e.g., reducing moving toward the second end 113 of the hub 110).

Because the hub 110, the blades 120, and the fillets 125 are cast and integrally formed with each other, there may be no clear delineation between the fillets 125, the hub 110, and blades 120. For purposes of this disclosure, the fillet 125 is considered the region of the turbine wheel 100 between a natural profile 116a of the primary outer surface 116 and a natural profile 123a or 124a of one of the opposed side surfaces 123 or 124 of the blade 120. As illustrated in FIGS. 9-11, the natural profile 116a of the primary outer surface 116 of the hub 110 and the natural profiles 123a, 124a of the opposed side surfaces 123, 124 of the blade 120 are those contours that, absent the fillets 125, would otherwise be followed before intersecting each other. The natural profile 116a of the primary outer surface 116 is circular, while the natural profiles 123a, 124a of the opposed side surfaces 123, 124 may generally taper away from each other moving radially inward toward the primary outer surface 116. The natural profiles 123a, 124a may, for example, taper away from each other in a linear manner, but may follow a more complex geometry (e.g., concave, convex, etc.) depending on the shape and curvature of the blade 120. In FIGS. 10-11, the outer edge 125a of the fillet 125 (i.e., that engaging the primary outer surface 116) is also depicted in phantom (i.e., dash-dash lines).

The thickness of the blade 120 ($T_{blade}$) is defined as the distance extending tangentially relative to the central axis 111 between the opposed outer surfaces 123, 124 of the blade 120. As shown in FIG. 9, in regions where the fillet 125 is present (e.g., at the intersection between the primary outer surface 116 and the blade 120), the thickness of the blade 120 ($T_{blade}$) is that between the natural profiles 123a, 124a of the opposed surfaces 123, 124 of the blade 120. That is, the thickness of the blade 120 ($T_{blade}$) omits the fillet 125.

Similarly, as shown in FIGS. 10-11, in regions where the blade 120 or fillet 125 is present, the thickness of the back wall 114 ($T_{back\_wall}$) is that between the back wall surface 115 and the natural profile 116a of the primary outer surface 116 of the hub 110. That is, the thickness of the back wall 114 ($T_{back\_wall}$) omits the blade 120 and the fillet 125.

According to an exemplary embodiment, the turbine wheel 100 is relatively large, includes the thin back wall 114, and in the first 30% meridional distance, the thickness of the blade 120 ($T_{blade}$) at the back wall 114 is less than the back wall thickness ($T_{back\_wall}$). The turbine wheel 100 may be considered relatively large, for example, by having the peripheral edge 119 with a diameter that is approximately 60 mm or greater, approximately 70 mm or greater, or approximately 96 mm or greater (e.g., up to approximately 150 mm in diameter). The back wall 114 may be considered thin, for example, by having a thickness at the 30% meridional distance that is approximately 8% or less of the maximum diameter of the hub 110 at the peripheral edge 119 (e.g., $T_{back\_wall\_30\%}$=<8% maximum diameter). From the 30% meridional distance, the back wall 114 reduces in thickness to a thickness at the peripheral edge 119 that is approximately 2.5% or less of the maximum diameter (e.g., $T_{back\_wall\_edge}$=<2.5% maximum diameter, such as between 1.3% and 2.5%, and/or less than 2%). The blade thickness may be less than the back wall thickness over the radially outer region (e.g., the 0-30% meridional distance). For example, at common meridional positions, the blade thickness may be less than 80% of the back wall thickness, such as between 60% and 80% of the back wall thickness. This may also be expressed as a blade thickness ratio of the blade thickness to the back wall thickness at common meridional positions being less than 1, such as less than 0.8 (e.g., between 0.6 and 0.8).

Instead of or in addition to being defined relative to meridional distance, the thickness of the blade 120 ($T_{blade}$) at the back wall 114 may be defined relative to the radial distance or an axial distance. For example, the thickness of the blade 120 ($T_{blade}$) at the back wall 114 is less than the back wall thickness ($T_{back\_wall}$) at a 60% radial distance (i.e., on the primary surface 116 at 60% of the diameter and measured perpendicular from the central axis 111) and moving radially outward therefrom. The thickness of the blade 120 ($T_{blade}$) at the back wall 114 may be less than the back wall thickness ($T_{back\_wall}$) at a 4% axial distance (i.e., on the primary surface 116 at 4% of the total distance from the back wall surface 115 to the second end 113 of the hub and measured parallel with the central axis 111) and moving axially toward the back wall 114 therefrom.

Figure 12:
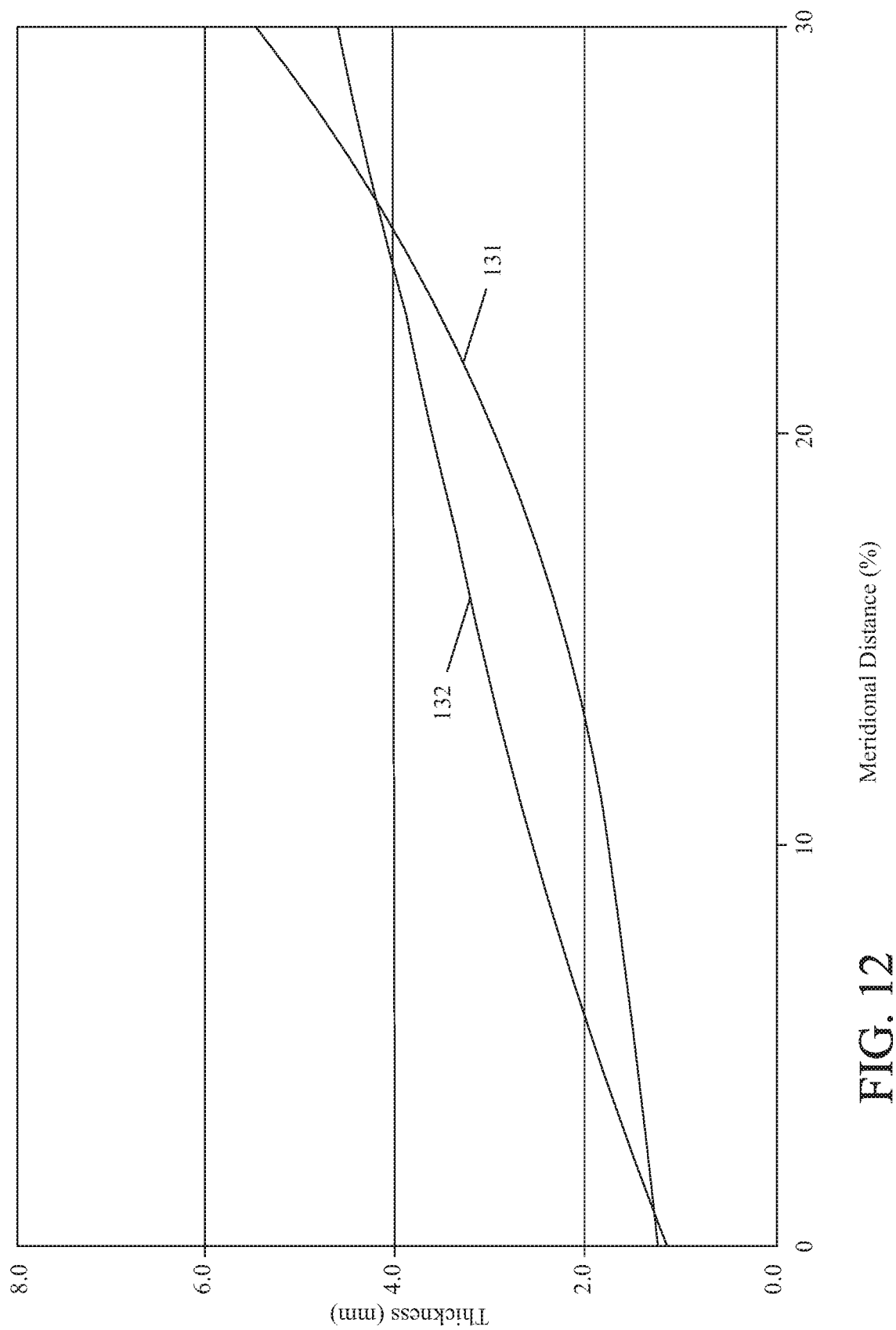
FIG. 12 is a plot of hub and blade thickness vs. meridional distance for a conventional turbine wheel.
Figure 13:
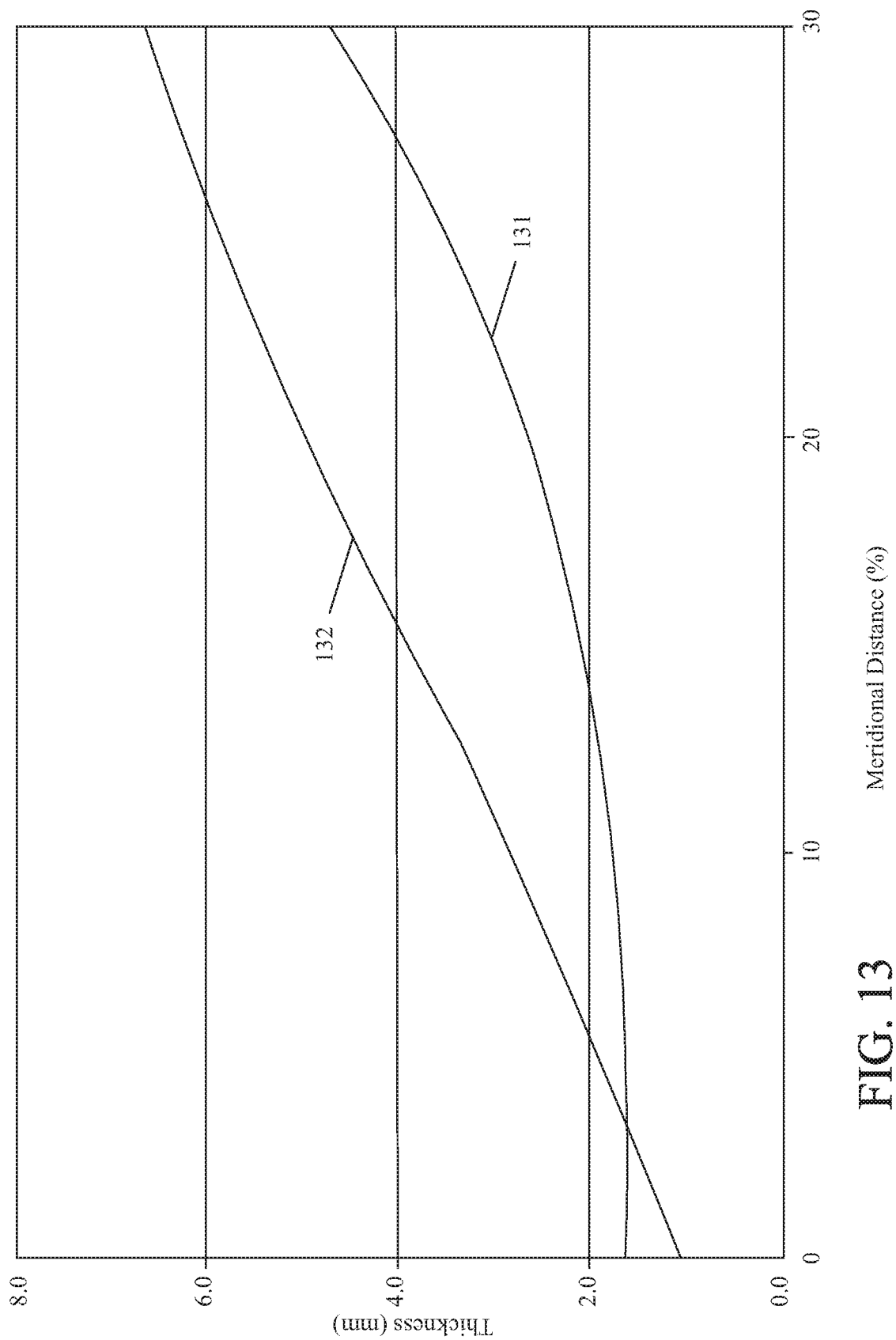
FIG. 13 is a plot of hub and blade thickness vs. meridional distance for another conventional turbine wheel.

FIGS. 12 and 13 are plots of back wall thickness 131 ($T_{back\_wall}$) and blade thickness 132 ($T_{blade}$) versus % meridional distance for conventionally designed turbine wheels having 70 mm and 96 mm maximum diameters, respectively. In FIGS. 12 and 13, the back wall thickness 131 ($T_{back\_wall}$) and blade thickness 132 ($T_{blade}$) are expressed in an absolute measure (i.e., mm). For both the 70 mm turbine wheel (shown in FIG. 12) and the 96 mm turbine wheel (shown in FIG. 13), the blade thickness ($T_{blade}$) is greater than the back wall thickness ($T_{back\_wall}$) over the vast majority of the radially outer region 117 (i.e., a vast majority of the 0-30% meridional distance). Computer casting simulations and physical parts for each of these conventionally-designed 70 mm and 96 mm turbine wheels exhibited excessive back wall irregularity that might require excessive machining, result in off-axis mounting of a rotation shaft, and/or require scrapping of the turbine wheel.

Figure 14:
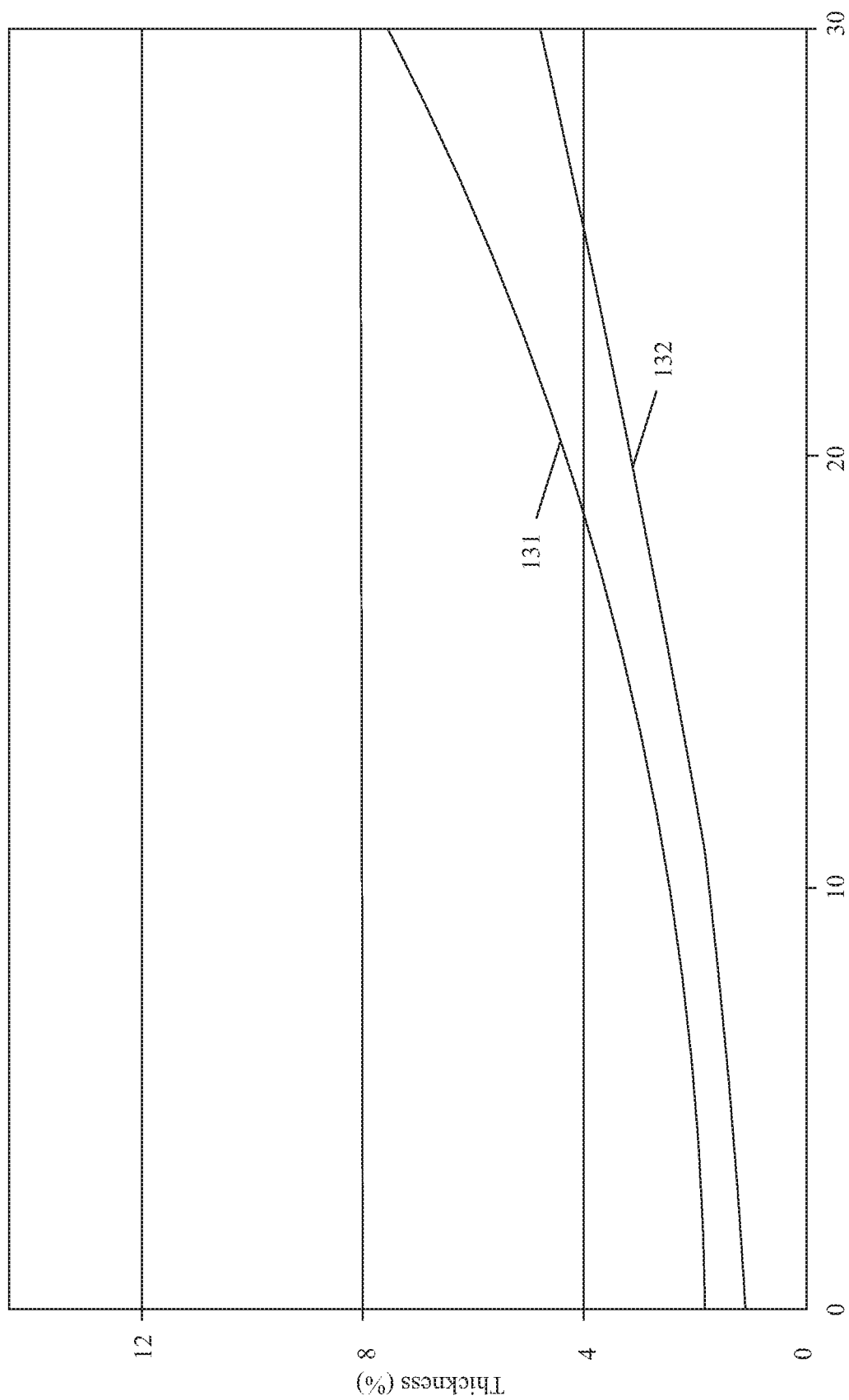
FIG. 14 is a plot of hub and blade thickness vs. meridional distance for a turbine wheel according to an embodiment.

FIG. 14 is a plot of back wall thickness 131 ($T_{back\_wall}$) and blade thickness 132 ($T_{blade}$) versus % meridional distance for a turbine wheel design according to an exemplary embodiment. In contrast to the absolute measure used in FIGS. 12 and 13, in FIG. 14, back wall thickness 131 ($T_{back\_wall}$) and blade thickness 132 ($T_{blade}$) are instead expressed as a percentage of the maximum diameter of the turbine wheel. In this exemplary turbine wheel, the blade 120 has a blade thickness ($T_{blade}$) that is less than the back wall thickness ($T_{back\_wall}$) over the entire radially outer region 117 (i.e., over the 0 to 25% or 30% meridional distance). Further, this exemplary turbine wheel includes the relatively thin back wall 114 (i.e., $T_{back\_wall\_30\%}$=~7.5%, and $T_{back\_wall\_edge}$=~1.8%). Computer casting simulations this exemplary embodiment of the turbine wheel 100 exhibited less significant back wall irregularity than the conventionally-designed 70 mm and 96 mm turbine wheels illustrated in FIGS. 12-13.

Based on the foregoing, it would be advantageous to design large turbine wheels with thin back walls and blades that are thinner than the back walls in radially outer regions. Large turbine wheels may be considered those having a maximum diameter of the peripheral edge 119 that is approximately 60 mm or greater, such as 70 mm or greater or 96 mm or greater. Turbine wheels with thin back walls may be considered those having a back wall thickness at the 30% meridional distance that is 15% or less, such as 8% or 6% or less of the maximum diameter and/or having a back wall thickness at the peripheral edge (i.e., 0% meridional distance) that is 2.5% or less (e.g., 2% or less) of the maximum diameter. The blades may be thinner than the back wall over the outer region extending between the 0% and 30% meridional distance.

It would also be advantageous to cast such a turbine wheel 100 according to the aforementioned design (e.g., with Inconel 713C, Inconel 713LC, MAR 246, MAR 247, or similar materials), as such a cast turbine wheel 100 would be less susceptible to centrifugal back wall stress than other turbine wheels having a thicker back wall 114, and less susceptible to back wall irregularity than other turbine wheels having a blade thickness that is greater than the back wall thickness in a radially outer region thereof. Subsequent to casting, the cast turbine wheel 100 may be evaluated by measuring the back wall irregularity of the back wall surface 115, and comparing the back wall irregularity to the design specification and tolerance (e.g., first and second thresholds). If the back wall irregularity exceeds the first threshold (e.g., 70 microns, or approximately 0.001 or 0.002 times the wheel diameter in 10 micron increments, such as 70 microns for a 70-80 mm wheel, 80 microns for a 80-90 mm wheel, etc.), the cast turbine wheel 100 may then be further machined, such as to remove material from at least a portion of the back wall 114 (or back wall surface 115) of the hub 110 and/or using the back wall surface 115 as a datum for orienting the cast turbine wheel 100 for attaching a rotation shaft thereto. For example, if the measured irregularity is less than the first threshold for a back wall designed to be planar, the back wall is considered within specification and to be substantially planar. Alternatively, if the back wall irregularity exceeds the second threshold (e.g., 400 microns, or 0.004 times the wheel diameter), the cast turbine wheel 100 is scrapped or subject to still further operations. If the turbine wheel 100 is acceptable (e.g., after casting and/or subsequent machining), a turbocharger may then be assembled by providing a housing, inserting the resultant cast and machined turbine wheel 100, and coupling a compressor wheel to the turbine wheel 100.

In still further exemplary embodiments, it may be advantageous for turbine wheels to have the blade thickness be relatively constant and/or be approximately equal to 1 over a majority (e.g., near entirety) of the radially outer region 117 (e.g., the 0-25% or 30% meridional distance).

Figure 15:
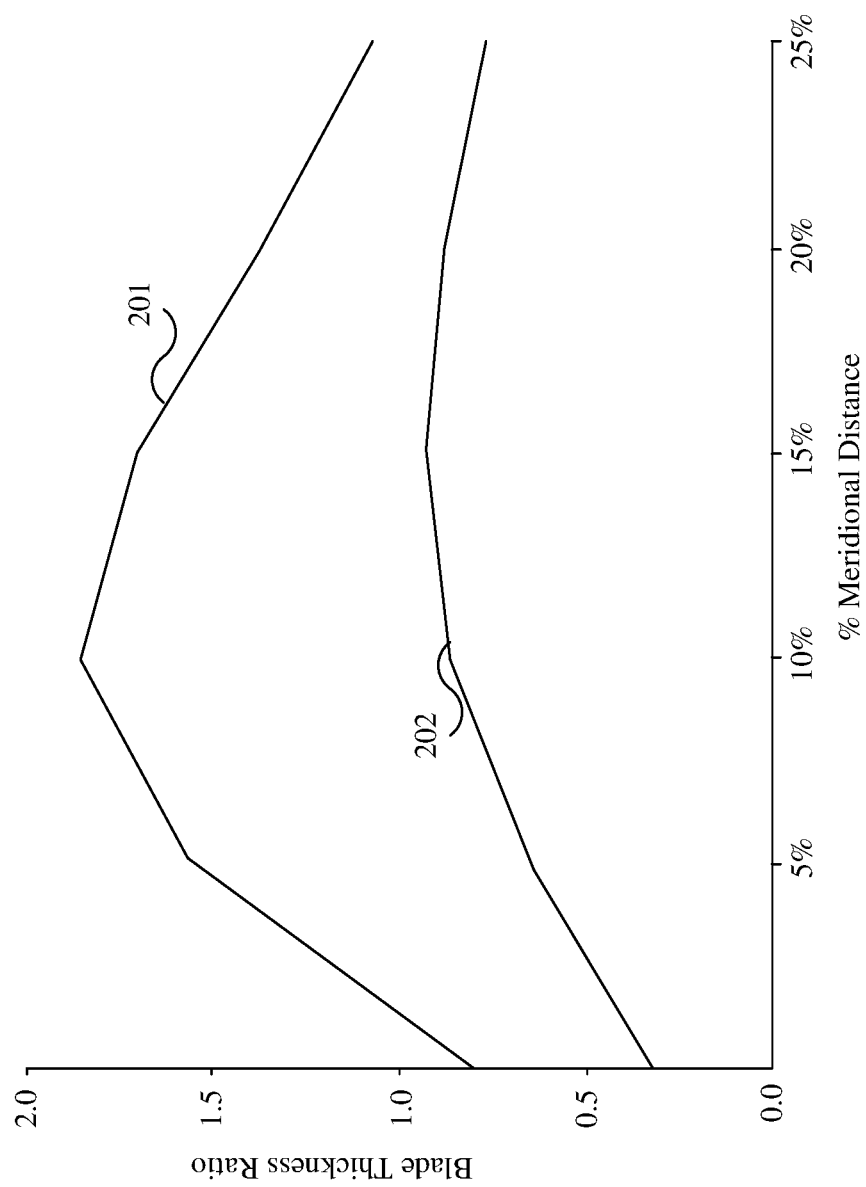
FIG. 15 is a plot of blade thickness ratio vs. meridional distance for two turbine wheels.

Referring to FIG. 15, casting simulations were performed for turbine wheels having a common hub design with different blade thicknesses. In FIG. 15, the blade thickness ratio 201 is shown for the first turbine wheel and the blade thickness ratio 202 for the second turbine wheel is shown. The first turbine wheel had a blade thickness ratio 201 that over the outer 25% meridional distance ranged between approximately 0.80 and 1.85. Over any meridional range that includes a continuous majority of the outer 25% meridional distance (i.e., an intermediate 15% meridional range), the blade thickness ratio 201 had a minimum variance of approximately 32% from the lowest blade thickness ratio in the meridional range. More particularly, the blade thickness ratio 201 ranged from approximately 1.40 to 1.85 (i.e., 1.40+~32%) over the meridional range extending between the 5% and 20% meridional distances. In the casting simulations, the first turbine wheel exhibited backwall irregularity (e.g., waviness) of approximately 150 microns, which may fall outside acceptable tolerances (e.g., 100 microns).

The second turbine wheel had a blade thickness ratio 202 that over the outer 25% meridional distance ranged between approximately 0.35 and 0.95. Over any meridional range that includes a continuous majority of the outer 25% meridional distance (i.e., an intermediate 15% meridional range), the blade thickness ratio 202 had a minimum variance of approximately 19% from the lowest blade thickness ratio in the meridional range. More particularly, the blade thickness ratio 202 ranged from approximately 0.8 to 0.95 (i.e., 0.8+~19%) over the meridional range extending between the 10% and 25% meridional distances. In the casting simulations, the second turbine wheel exhibited back wall irregularity of approximately 60 microns, thus exhibiting significantly reduced backwall irregularity as compared to the first turbine wheel.

It is observed that the blade thickness ratio 202 of the second turbine wheel, over a majority of the radially outer region consisting of the outer 25% meridional distance, was approximately equal to one (e.g., 1+/−0.2) and varied by less than 25% from the lowest blade thickness ratio within the majority. Without being limited to particular theories, it is believed that the blade thickness ratio being approximately equal to one may result in reduced backwall irregularity, because the blade and the back wall freeze during the casting process in close time proximity to each other along the majority of the radially outer region of the turbine wheel. It is further believed that the blade thickness ratio varying by less than 25% may result in reduced backwall irregularity, because the blade and the back wall freeze during the casting process in a consistent time sequence along the majority of the radially outer region of the turbine wheel.

Possible further improvement to back wall irregularity may be achieved by having the backwall thickness ratio be approximately equal to one or have low variance over larger portions of the radially outer region (e.g., nearly the entire 25% or 30% meridional distance), by having the backwall thickness ratio being approximately equal to but less than one (e.g., 0.8 to 1.0), and/or by having less variance (e.g., less than 25%, such as 15% or less variance).

As also described above, reducing backwall irregularity may be especially beneficial for larger turbine wheels (e.g., those having a diameter greater than 60 mm, 70 mm or greater, or 96 mm or greater), because larger turbine wheels may be particularly sensitive to backwall irregularity due to their larger diameters magnifying irregularities and resultant imbalances. Reducing backwall irregularity may also be beneficial for turbine wheels having thin back walls (e.g., having back wall thickness that is 7.5% or less of the wheel diameter, such as 6% or less at the 25% or 30% meridional distance and radially outward therefrom), because less material may be removed to bring turbine wheels into specification (e.g., maximum of 100 microns backwall irregularity).

Accordingly, turbine wheels are contemplated that have a backwall thickness ratio that, over a majority or near entirety of a radially outer region, is approximately equal to one (e.g., 0.8 to 1.2), is less than one, and/or has low variance (e.g., 25% or less, such as 15% or less). The radially outer region may be the outer 25% or 30% meridional distance with the majority being at least a 15% meridional range therein. Such turbine wheels may also have a diameter of 60 mm or more (e.g., 70 mm or more, 80 mm or more, or 96 mm or more) and/or a thin back wall (e.g., having a back wall thickness that is 7.5% or less, such as 6% or less than the diameter of the turbine wheel at the 30% meridional distance or the 25% meridional distance and radially outward therefrom.

EMBODIMENTS

1. A method of manufacturing a turbocharger comprising steps of:
    casting a turbine wheel according to a turbine wheel design to form a cast turbine wheel, wherein the turbine wheel design comprises:
        a hub having a primary outer surface, a back wall surface, a peripheral edge extending between the primary outer surface and the back wall surface, and an axis; and
        a plurality of blades coupled to and integrally formed with the primary outer surface of the hub;
        wherein in an entirety of a radially outer region that extends from the peripheral edge to a 30% meridional distance along the primary outer surface, the hub has a back wall thickness that is approximately 8% or less of a maximum diameter of the peripheral edge, the back wall thickness being measured substantially parallel to the axis from the primary outer surface to the back wall surface;
        wherein the maximum diameter of the peripheral edge of the turbine wheel design is approximately 60 mm or more; and
        wherein in the entirety of the radially outer region, each blade has a blade thickness at the hub that is less than the back wall thickness corresponding thereto, the blade thickness being measured tangential to the axis between opposed surfaces of the blade;
    providing a housing;
    inserting the cast turbine wheel into the housing;
    providing a compressor wheel; and
    coupling the compressor wheel to the turbine wheel.

2. The method according to embodiment 1, wherein the back wall thickness of the turbine wheel design is approximately 8% or less of the maximum diameter of the peripheral edge at the 30% meridional distance, and is approximately 2.5% or less of the maximum diameter of the peripheral edge adjacent the peripheral edge.

3. The method according to embodiment 2, wherein the maximum diameter of the peripheral edge of the turbine wheel design is approximately 96 mm or more.

4. The method according to embodiment 1, wherein the back wall surface of the turbine wheel design is planar in the radially outer region.

5. The method according to embodiment 4, wherein the back wall is a full back.

6. The method according to embodiment 1, wherein the turbine wheel design further includes a plurality of fillets, each fillet forming a curved transition between the primary outer surface of the hub and one of the opposed surfaces of one of the blades.

7. The method according to embodiment 6, wherein the blade thickness and the corresponding back wall thickness omit the fillets.

8. The method according to embodiment 6, wherein the blade thickness at the hub of the turbine wheel design is measured between natural profiles of the opposed surfaces of the blade, and the corresponding back wall thickness is measured between a natural profile of the primary outer surface and the back wall surface.

9. The method according to embodiment 1, further comprising evaluating the cast turbine wheel, the step of evaluating comprising measuring a back wall irregularity of the back wall surface of the cast turbine wheel, and comparing the back wall irregularity to a tolerance requirement of the turbine wheel design, wherein the step of evaluating is performed after the step of casting and prior to the step of inserting.

10. The method according to embodiment 8, wherein if the back wall irregularity exceeds a first threshold, the cast turbine wheel is machined to remove material from the back wall surface of the cast turbine wheel, or if the back wall irregularity exceeds a second threshold, the cast turbine wheel is scrapped.

11. A turbocharger comprising:
    a housing configured to receive exhaust gas from an engine;
    a turbine wheel positioned within the housing to be rotated by exhaust gas received form an engine into the housing; and
    a compressor wheel coupled to the turbine wheel to be rotated by the turbine wheel;
    wherein the turbine wheel comprises:
        a hub comprising a primary outer surface, a back wall surface, and a peripheral edge extending between the primary outer surface and the back wall surface, the hub having an axis; and
        a plurality of blades coupled to and integrally formed with the primary outer surface of the hub;
        wherein in an entirety of a radially outer region, the hub has a back wall thickness that is approximately 8% or less of a maximum diameter of the peripheral edge, the radially outer region extending radially inward from the peripheral edge to a 30% meridional distance along the primary outer surface, and the back wall thickness being measured parallel to the axis from the primary outer surface to the back wall surface;

wherein the maximum diameter of the peripheral edge is approximately 96 mm or more; and wherein in the entirety of the radially outer region, each blade has a blade thickness at the hub that is less than the back wall thickness corresponding thereto, the blade thickness being measured tangential to the axis between opposed surfaces of the blade.

12. The turbocharger according to embodiment 11, wherein the back wall thickness is approximately 8% or less of the maximum diameter of the peripheral edge at the 30% meridional distance, and is approximately 2.5% or less of the maximum diameter of the peripheral edge adjacent the peripheral edge.

13. The turbocharger according to embodiment 12, wherein the maximum diameter of the peripheral edge is approximately 96 mm or more.

14. The turbocharger according to embodiment 10, wherein the back wall surface is substantially planar in the radially outer region, and the back wall is a full back.

15. The turbocharger according to embodiment 10, wherein the turbine wheel further includes a plurality of fillets, each fillet forming a curved transition between the primary outer surface of the hub and one of the opposed surfaces of one of the blades.

16. The turbocharger according to embodiment 15, wherein the blade thickness and the back wall thickness are measured omitting the fillet.

17. The turbocharger according to embodiment 16, wherein the blade thickness at the hub of the turbine wheel design is measured between natural profiles of the opposed surfaces of the blade, and the corresponding back wall thickness is measured between a natural profile of the primary outer surface and the back wall surface.

18. The turbocharger according to embodiment 17, wherein irregularity of the back wall is approximately 0.002 times the maximum diameter or less.

19. The turbocharger according to embodiment 10, wherein the thickness of the blade at the back wall is approximately 80% or less than the corresponding thickness of the back wall.

20. A turbine wheel for a turbocharger comprising:

a hub comprising a primary outer surface, a back wall surface, and a peripheral edge extending between the primary outer surface and the back wall surface, the hub having an axis, and a radially outer region in which at least a portion of the back wall surface is substantially planar; and a plurality of blades coupled to and integrally formed with the primary outer surface of the hub;

wherein in an entirety of a radially outer region, the hub has a back wall thickness that is approximately 8% or less of a maximum diameter of the peripheral edge at a 30% meridional distance along the primary outer surface and that is 2.5% of less of the maximum diameter adjacent the peripheral edge, the back wall thickness being measured parallel to the axis from the primary outer surface to a plane formed by the back wall surface;

wherein the maximum diameter of the peripheral edge is approximately 60 mm or more; and wherein in the entirety of the radially outer region, each blade has a blade thickness at the hub that is less than the back wall thickness corresponding thereto, the blade thickness being measured tangential to the axis between opposed surfaces of the blade.

While the present disclosure has been described in connection with certain embodiments, it is to be understood that the present disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A turbine wheel (100) for a turbocharger (10) comprising: a hub (110) having a primary outer surface (116), a back wall surface (115), a peripheral edge (119) extending between the primary outer surface (116) and the back wall surface (115), and a central axis (111), wherein the hub (110) has a back wall thickness that is measured parallel to the central axis (111) from the primary outer surface (116) to the back wall surface (115); and a plurality of blades (120) extending from the primary outer surface (116) of the hub (110) and integrally formed with the hub (110) via a casting process, wherein each of the blades (120) has a blade thickness that is measured tangential to the central axis (111) between opposed surfaces (123, 124) of the blade (120); wherein a diameter of the peripheral edge (119) is 60 mm or more; and wherein over a majority of a radially outer region (117), a thickness ratio of the blade thickness to the back wall thickness is between 0.8 and 1.2, the radially outer region (117) extending from the peripheral edge (119) to a 25% meridional distance along the primary outer surface (116), wherein the majority includes a 15% meridional range along the primary outer surface (116).

2. The turbine wheel (100) according to claim 1, wherein over the majority of the radially outer region (117), the thickness ratio varies by 15% or less.

3. The turbine wheel (100) according to claim 1, wherein at the 25% meridional distance, the back wall thickness is 6% or less than the maximum diameter.

4. The turbine wheel (100) according to claim 1, further comprising fillets (125) between each of the blades (120) and the primary outer surface (116) and formed integrally therewith via the casting process, wherein the back wall thickness and the blade thickness are measured without the fillets (125).

5. The turbine wheel (100) according to claim 1, wherein over the majority of the radially outer region (117), the thickness ratio varies by 25% or less.

6. The turbine wheel (100) according to claim 1, wherein the thickness ratio of the blade thickness to the back wall thickness varies by 25% or less.

7. The turbine wheel (100) according to claim 1, wherein the thickness ratio of the blade thickness to the back wall thickness is one or less.

* * * * *

UNITED STATES PATENT AND TRADEMARK OFFICE
CERTIFICATE OF CORRECTION

PATENT NO. : 11,346,226 B2
APPLICATION NO. : 16/472558
DATED : May 31, 2022
INVENTOR(S) : Lakshmi Srikar Yellapragada It is certified that error appears in the above-identified patent and that said Letters Patent is hereby corrected as shown below:

In the Specification

At Column 6, Line number 53, please make the following change(s):
edge 119 (i.e., $T_{back\_wall\_edge}=<2.5\% \times R_{turbine\_wheel} \times 2$), such Should read:
edge 119 (i.e., $T_{back\_wall\_edge}=<2.5\% \times R_{turbine\_wheel} \times 2$), such At Column 6, Line number 64, please make the following change(s):
119 (e.g., $T_{back\ wall}\ 30\%=<15\% \times R_{turbine\ wheel} \times 2$). For Should read:
119 (e.g., $T_{back\_wall\_}30\% =< 15\% \times R_{turbine\_wheel} \times 2$). For In the Claims At Column 14, Claim number 1, Line numbers 19-39, please make the following change(s):
A turbine wheel (100) for a turbocharger (10) comprising: a hub (110) having a primary outer surface (116), a back wall surface (115), a peripheral edge (119) extending between the primary outer surface (116) and the back wall surface (115), and a central axis (111), wherein the hub (110) has a back wall thickness that is measured parallel to the central axis (111) from the primary outer surface (116) to the back wall surface (115); and a plurality of blades (120) extending from the primary outer surface (116) of the hub (110) and integrally formed with the hub (110) via a casting process, wherein each of the blades (120) has a blade thickness that is measured tangential to the central axis (111) between opposed surfaces (123, 124) of the blade (120); wherein a diameter of the peripheral edge (119) is 60 mm or more; and wherein over a majority of a radially outer region (117), a thickness ratio of the blade thickness to the back wall thickness is between 0.8 and 1.2, the radially outer region (117) extending from the peripheral edge (119) to a 25% meridional distance along the primary outer surface (116), wherein the majority includes a 15% meridional range along the primary outer surface (116).

Signed and Sealed this
Twenty-third Day of August, 2022

Katherine Kelly Vidal
*Director of the United States Patent and Trademark Office*

Should read:

A turbine wheel (100) for a turbocharger (10) comprising:

a hub (110) having a primary outer surface (116), a back wall surface (115), a peripheral edge (119) extending between the primary outer surface (116) and the back wall surface (115), and a central axis (111), wherein the hub (110) has a back wall thickness that is measured parallel to the central axis (111) from the primary outer surface (116) to the back wall surface (115); and a plurality of blades (120) extending from the primary outer surface (116) of the hub (110) and integrally formed with the hub (110) via a casting process, wherein each of the blades (120) has a blade thickness that is measured tangential to the central axis (111) between opposed surfaces (123, 124) of the blade (120);

wherein a diameter of the peripheral edge (119) is 60 mm or more; and wherein over a majority of a radially outer region (117), a thickness ratio of the blade thickness to the back wall thickness is between 0.8 and 1.2, the radially outer region (117) extending from the peripheral edge (119) to a 25% meridional distance along the primary outer surface (116), wherein the majority includes a 15% meridional range along the primary outer surface (116).